United States Patent [19]

Covey, Jr.

[11] Patent Number: 4,494,516
[45] Date of Patent: Jan. 22, 1985

[54] CARBURETOR/VAPORIZER

[76] Inventor: Ray M. Covey, Jr., 9700 Trinidad, El Paso, Tex. 79925

[21] Appl. No.: 530,759

[22] Filed: Sep. 9, 1983

[51] Int. Cl.³ ............................................. F02M 31/00
[52] U.S. Cl. ................................... 123/557; 123/552; 123/578
[58] Field of Search ............... 123/557, 552, 525, 575, 123/578

[56] References Cited

U.S. PATENT DOCUMENTS

| | | | |
|---|---|---|---|
| 1,361,503 | 12/1920 | Smith | 123/557 |
| 2,315,881 | 4/1943 | Thomas | 123/525 |
| 2,339,988 | 1/1944 | Gerson | 123/525 |
| 2,617,633 | 11/1952 | Van Den Bosch | 123/557 |
| 2,882,882 | 4/1959 | Pantano | 123/552 |
| 3,713,429 | 1/1973 | Dwyre | 123/552 |
| 3,738,334 | 6/1973 | Farr | 123/557 |
| 3,913,543 | 10/1975 | Richard | 123/557 |
| 4,216,751 | 8/1980 | Davison | 123/557 |
| 4,306,531 | 12/1981 | Watkins | 123/557 |
| 4,398,523 | 8/1983 | Henson | 123/557 |

Primary Examiner—Ronald H. Lazarus
Attorney, Agent, or Firm—Paul H. Gallagher

[57] ABSTRACT

The fuel flows to the usual carburetor, initially, and when the engine heats up, the fuel is directed to a vaporizer, continuing through a line in the vaporizer, and then, as vapor, to the carburetor. In the vaporizer, the exhaust gasses flow over and around the fuel line and heat the fuel and vaporizes it. A two-way valve responds to the heat of the exhaust gasses and controls the flow of the fuel to the carburetor or the vaporizer. A single carburetor is used for both the unvaporized fuel and the vaporized fuel. A surge tank is included in the vapor line between the vaporizer and the carburetor. An alternate form utilizes the coolant of the engine for vaporizing the fuel.

6 Claims, 7 Drawing Figures

U.S. Patent   Jan. 22, 1985   4,494,516
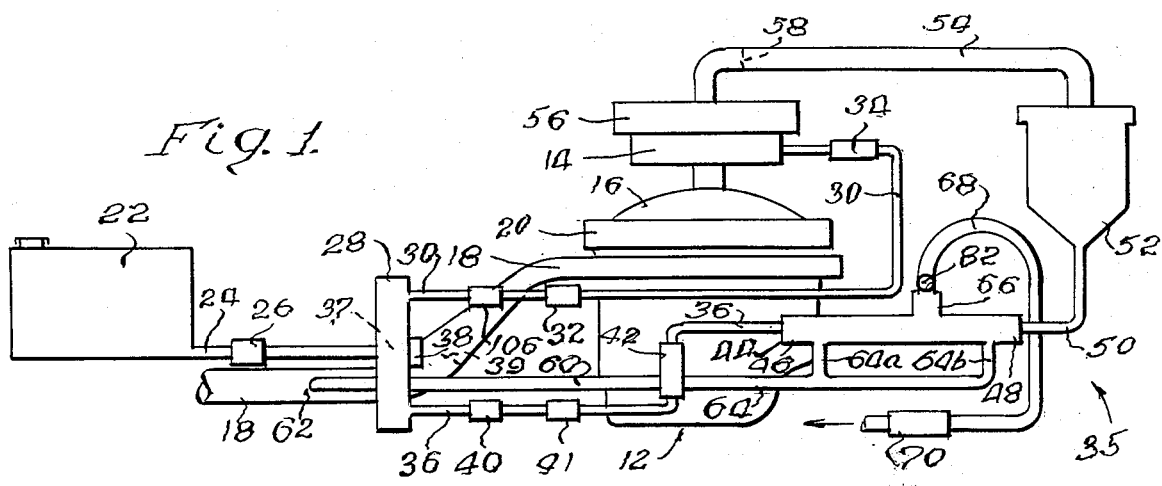
Fig. 1.
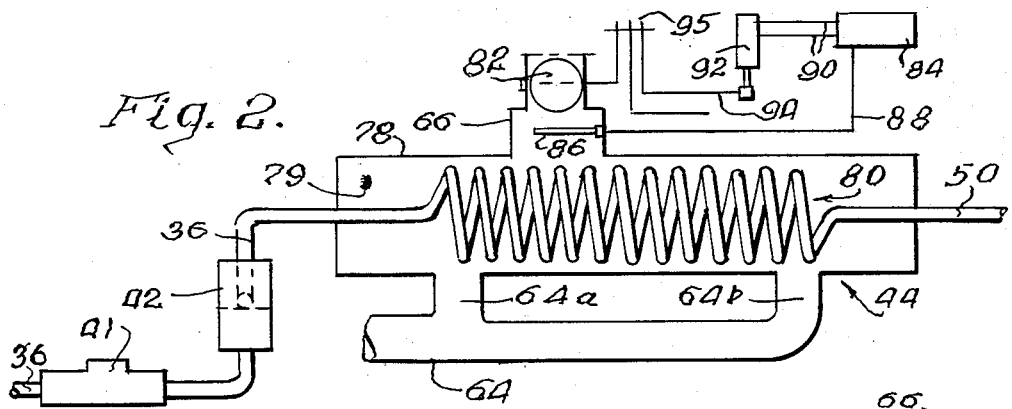
Fig. 2.
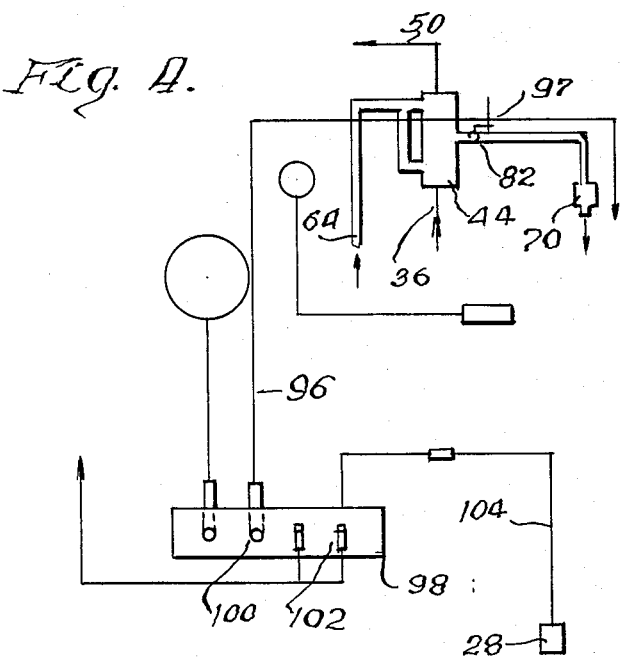
Fig. 4.
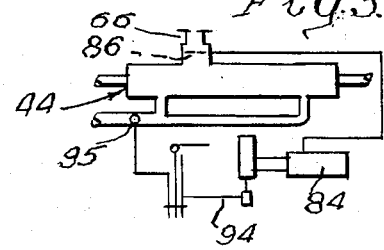
Fig. 3.
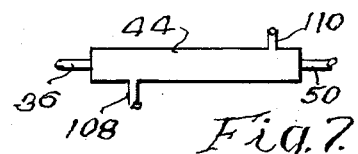
Fig. 7.
Fig. 5.
Fig. 6.

CARBURETOR/VAPORIZER

FIELD OF THE INVENTION

The invention resides in the field of automotive vehicles and particularly those using petroleum fuel. Heretofore, in such vehicles the fuel was atomized for combustion purposes, but as such, it is basically in liquid form, as contrasted to vapor form.

OBJECTS OF THE INVENTION

A broad object of the invention is to provide a novel system for vaporizing petroleum fuel for use in automotive vehicles and particularly such having the following features and advantages:

1. It includes an unusually effective arrangement for vaporizing the fuel.
2. The exhaust gases are utilized to heat and vaporize the fuel, and controls are provided for regulating the development of the vapor through the amount of exhaust gases used and the effective temperature thereof.
3. The development of vapor is of such quantities as to provide full speed and power desired, in the engine.
4. It includes apparatus highly adaptable to retrofitting to vehicles.

DESCRIPTION OF A PREFERRED EMBODIMENT

In the drawings,

FIG. 1 is a general view, semi-diagrammatic in parts, of the apparatus of the invention applied to the engine of an automotive vehicle;

FIG. 2 is an enlarged view, partially in section, and partially diagrammatic, of certain elements of the apparatus of FIG. 1;

FIG. 3 is a diagrammatic view showing an alternative arrangement relative to that of FIG. 2;

FIG. 4 is a diagrammatic view of a series of controls for the apparatus, including instruments mounted on the dashboard of an automobile;

FIG. 5 is a detail view of an injector ring applied to the carburetor of the engine;

FIG. 6 is a detail view of a safety screen utilized in the apparatus; and

FIG. 7 is a diagrammatic view representing the use of the engine coolant for vaporizing the fuel.

Referring in detail to the accompanying drawings, attention is directed first to FIG. 1 showing the apparatus in its entirety as applied to the engine of an automotive vehicle, showing the various components thereof, as well as various components of the automobile, partially in diagrammatic form.

A principal feature of the invention is its great adaptability to retrofitting to an automobile. The disclosure herein includes certain basic and standard components of an automobile, and the components of the apparatus of the invention applied to the vehicle with virtually no change to those standard components, or a minimum of such change.

FIG. 1 includes the engine 12 of the vehicle having a diaphragm carburetor 14, an intake manifold 16 and an exhaust manifold 18. The arrangement also includes a valve cover 20, all of the foregoing elements being of known kind. The automobile includes the usual gasoline tank 22 from which a main fuel line 24 leads, the line including a fuel pump 26.

While the system of the invention is applicable to various automotive vehicles utilizing petroleum fuel, the most common example of such a vehicle is the automobile and for convenience the following description is somewhat keyed to that feature, although it is to be understood that the invention is not limited thereto.

The present apparatus includes a two-way valve 28 of suitable kind such as operated by an electric solenoid, the fuel line 24 leading to this valve and the valve being utilized for selectively directing the fuel to the carburetor incorporated in the vehicle, or to the vaporizer apparatus of the invention. Leading from the two-way valve 28 is a first extension fuel line 30 preferably containing a fuel filter 32 and continuing to the usual carburetor 14 referred to above. A fuel lock 34 may be incorporated in this line.

Also leading from the two-way valve 28 is a second extension fuel line 36 leading to the vaporizer component of the invention, which is indicated in its entirety at 35. The two-way valve 28 is controlled by a valve element 37 controlled by an electrical control 38, itself controlled by a heat sensor element 39 located in the exhaust gas line at a suitable location. Upon the temperature of the exhaust gasses reaching a predetermined point, the valve element 37 is moved to position for directing the fuel to the vapor unit. It also may be activated manually, as referred to below. The fuel line 36 preferably also has a fuel filter 40 and a manually adjustable fuel pressure regulator 41 of known kind. The line 36 continues and includes a suitable check valve 42 and then continues to a vaporizer unit 44 to be described in detail hereinbelow. The vaporizer unit includes a fuel inlet end 46 to which the fuel line 36 is connected, and a fuel outlet end 48 from which a fuel line 50 leads, this line leading to a surge tank or supply tank 52. The fuel vapor is directed to the surge tank 52 and provides a supply for the demands of the engine, and from this surge tank a vapor line 54 leads to the carburetor, and includes a vapor adapter 56 applied directly to the carburetor and constitutes the means for directing the vapor into the carburetor. Preferably the vapor line 54 includes a safety screen 58 (see also FIG. 5) to prevent the propagation of any flash into the vapor line.

The vaporizer unit 44 is supplied with exhaust gasses for vaporizing the fuel, and for this purpose, a hose or tube 60 leads from the engine exhaust manifold at 62 and continues to another tube which may be in the form of a metal pipe 64 having two inlet segments 64a and 64b leading through the vaporizer unit 44. The vaporizer unit includes an outlet element or casing 66 which leads to another tube or hose 68 which in turn is connected with muffler means 70 and then to the exterior.

Reference to FIG. 5 is made to show the construction of the vapor adaptor 56, which includes a tubular ring 72 having apertures 74 directed into the carburetor inlet 75, the vapor thus flowing through this ring and the apertures 74 downwardly into the carburetor. Upon operation of the engine and the usual intake draft, the fuel vapor is drawn into the engine as indicated by the arrow 76.

FIG. 2 shows details of the vaporizer unit 44 and associated elements shown in FIG. 1. FIG. 2 includes the pressure regulator 41 and check valve 42, and the fuel line 36 leading to the vaporizer unit 44. The vaporizer unit includes a casing or shell 78 generally closed and forming an exhaust gas chamber 79 therein, but the casing has openings specifically referred to. Mounted in the casing 78 is a coil 80 of suitable size according to the capacity desired, for accommodating the necessary fuel.

This coil may be referred to as a vaporizer fuel line. The coil is of steel tubing of in the neighborhood of ½" diameter and of for example 12 to 20 feet of linear length. The fuel line 36 and vapor line 50 are of course sealed to the coil.

The fuel passing through the fuel coil 80 is vaporized by the heated exhaust gasses, these gasses flowing, as indicated above, through the exhaust line 64 into the interior or the casing or shell in heat exchange contact with the coil, which thereby vaporize the fuel. The amount of fuel vaporized, i.e., the amount of vapor produced is controlled by the amount or volume of exhaust gasses flowing through the unit 44. The exhaust gasses may be controlled at either the inlet side, or the outlet side, of the unit, selectively. An arrangement for controlling them at the outlet side is shown in FIG. 2, while an arrangement for controlling them at the inlet side is shown in FIG. 3.

Referring first to the arrangement of FIG. 2, the outlet element 66 referred to above is shown in this figure, and positioned therein is a control valve 82 which may be in the form of a choke having a wafer. This control valve controls the flow of exhaust gasses through the vaporizer unit, controlling both the volume and rate thereof. This control valve is controlled by an automatic electrical control module 84, controlled by a heat sensor element 86 mounted in the outlet element 66 of the casing, in heat sensing engagement with the exhaust gasses flowing therethrough. Electrical wires 88 lead from the sensor element to the module, and other electrical wires 90 lead from the module to a servo motor 92 which actuates an arm 94 connected at 95 with the control valve 82. The arrangement of this heat sensing component just described is such that upon the temperature reaching a certain predetermined maximum, the valve is shut down, or partially closed, and conversely when it reaches a certain minimum, the valve is opened. These steps control the evaporation of the fuel.

In the arrangement of FIG. 3, a valve 95, which may be of the same kind as the valve 82, is placed in the inlet line as referred to above, instead of in the outlet line. The control instruments 84, 86, 94, described above, are utilized in this instance. The location of the heat sensor element 86 is not limited to the outlet as represented in FIG. 2, but it may be located at any of various places in the exhaust line, either before or after the unit 44, or in the casing 78 of that unit itself.

The outlet element 66 or other element in which the heat sensor element 86 is positioned is preferably at least 3" in diameter, to accommodate a heat sensor element of desired length, which is preferably 3" or more in length.

In the normal operation of the engine and the apparatus, the valve 82, or 95, is first left open, so that exhaust gasses will flow therethrough as the engine is started, and the vaporizer apparatus will normally operate in every use of the vehicle.

It is desired that certain manual controls be provided in addition to the automatic controls. Reference is made to FIG. 4 showing certain of these controls. For example, a cable element 96, preferably in the form of a boden wire is connected with an arm 97 of the control valve 82 and leads to the dash 98 of the automobile where a manually controlled member or knob 100 is located, enabling the driver to manually control the valve 82. FIG. 4 also shows the two-way valve 28 and a manually actuatable member 102 acting through a boden wire 104. Various other manual control elements may be mounted on the dash for manually controlling various other elements of the apparatus. Preferably, a manually controlled fuel pump 106 is provided in the fuel line 30, as an added feature.

It is also contemplated that the scope of the invention is such as to cover the vaporization of the fuel by the heated engine coolant. FIG. 7 represents such an arrangement, where the coolant flows from the engine through an inlet line 108 into the casing of the vaporizer unit 44, and out through an outlet line 110, in return to the engine.

In the operation of the apparatus, the vapor is drawn into the engine through the carburetor, and at a rate controlled by the carburetor as actuated by the driver.

I claim:

1. Carburetor/vaporizer apparatus adapted for retrofitting to an automobile having a petroleum fuel engine, a carburetor, a fuel tank, means for transmitting fuel from the fuel tank to the carburetor including a main fuel line, and the automobile also including an exhaust line, said apparatus comprising,
   a first extension fuel line adapted to be connected with the main fuel line and leading to the carburetor,
   a vapor adaptor applied to the carburetor and operative for directing vapor passing therethrough into the air intake passage of the carburetor,
   a vaporizer unit including an outer casing and a tubular vaporizer fuel line therethrough, the casing forming an exhaust gas chamber entirely surrounding the vaporizer fuel line,
   a second extension fuel line adapted to be connected between the main fuel line and the vaporizer fuel line, the vaporizer fuel line being operable for conducting fuel through the vaporizer unit and confining it against escape into the exhaust gas chamber,
   means for connecting the exhaust gas chamber to the exhaust line,
   means operable for diverting a portion of the exhaust gases from the exhaust line to the exhaust gas chamber, the exhaust gas chamber leading to the exterior,
   a vapor line connected between the vaporizer fuel line and the vapor adapter,
   means responsive to temperature of the exhaust gases in the exhaust line for directing fuel from the main fuel line selectively to the first and second extension fuel lines, and
   means responsive to temperature of the exhaust gases in the exhaust gas chamber for varying the rate of flow of gases through the exhaust gas chamber for correspondingly varying the temperature of the vapor in the vapor line.

2. Apparatus according to claim 1 wherein,
   the last means is operable for controlling the flow of gases at the outlet of the exhaust gas chamber.

3. Apparatus according to claim 1 wherein,
   the last means is operable for controlling the flow of gases at the inlet of the exhaust gas chamber.

4. Apparatus according to claim 1 and including,
   a surge tank in said vapor line to receive a supply of vapor and yield such to the engine in response to the demands of the engine throughout a period of operation of the engine.

5. Apparatus according to claim 1 and including,
   a vapor adapter applied to the carburetor and operable to receive vapor from the vapor line and direct it into the air intake line of the carburetor.

6. Apparatus according to claim 1 and including,
   manually actuated means for controlling the direction of the fuel flow selectively to the carburetor or the vaporizer unit, and for controlling the flow of gases through the vaporizer unit.

* * * * *